United States Patent [19]

Carter

[11] 4,308,999
[45] Jan. 5, 1982

[54] METHOD AND APPARATUS FOR LONGITUDINALLY REINFORCING CONTINUOUSLY GENERATED PLASTIC PIPE

[75] Inventor: J. Warne Carter, Wichita Falls, Tex.

[73] Assignee: Ciba-Geigy Corporation, Ardsley, N.Y.

[21] Appl. No.: 71,053

[22] Filed: Aug. 30, 1979

[51] Int. Cl.³ .................... B21F 17/00; B31C 1/00
[52] U.S. Cl. ..................... 242/7.02; 156/172
[58] Field of Search ............. 242/7.21, 7.02, 7.22, 242/7.23, 3; 156/172, 173; 57/11, 13

[56] References Cited

U.S. PATENT DOCUMENTS

| | | | |
|---|---|---|---|
| 3,113,738 | 12/1963 | Vanzo | 242/43 |
| 3,232,545 | 2/1966 | Ross | 242/7.21 |
| 3,303,079 | 2/1967 | Carter | 156/172 |
| 3,614,005 | 10/1971 | Chartier | 242/7.22 |
| 3,631,897 | 1/1972 | Fischer | 242/7.22 |
| 3,700,519 | 10/1972 | Carter | 156/156 |
| 3,708,131 | 1/1973 | Barthel | 242/3 |
| 3,720,569 | 3/1973 | Kimble | 161/57 |
| 3,721,599 | 3/1973 | Addis | 156/194 |
| 3,748,203 | 7/1973 | Greene | 156/175 |
| 3,761,341 | 9/1973 | Khuble | 156/446 |
| 3,784,429 | 1/1974 | Muller | 156/175 |
| 3,791,900 | 2/1979 | Goerden | 156/172 |
| 3,878,591 | 4/1975 | Jense | 156/439 |
| 4,010,054 | 3/1977 | Bradt | 156/173 |
| 4,053,343 | 10/1977 | Carter | 156/172 |
| 4,089,719 | 5/1978 | Sundell | 156/171 |
| 4,095,312 | 6/1978 | Haley | 156/439 |

FOREIGN PATENT DOCUMENTS 1054922 1/1967 United Kingdom .

*Primary Examiner*—Edward J. McCarthy
*Attorney, Agent, or Firm*—Shapiro and Shapiro

[57] ABSTRACT

Method and apparatus for longitudinally reinforcing continuously generated, resin-impregnated fiber pipe includes depositing longitudinal reinforcing fiber elements directly onto the surface of the pipe into the nip formed between the surface of the pipe being generated and fiber elements being wound circumferentially onto the pipe. Rollers contacting the pipe at the nip guide the longitudinal deposition of fiber elements supplied from a swinging supply tube.

8 Claims, 8 Drawing Figures

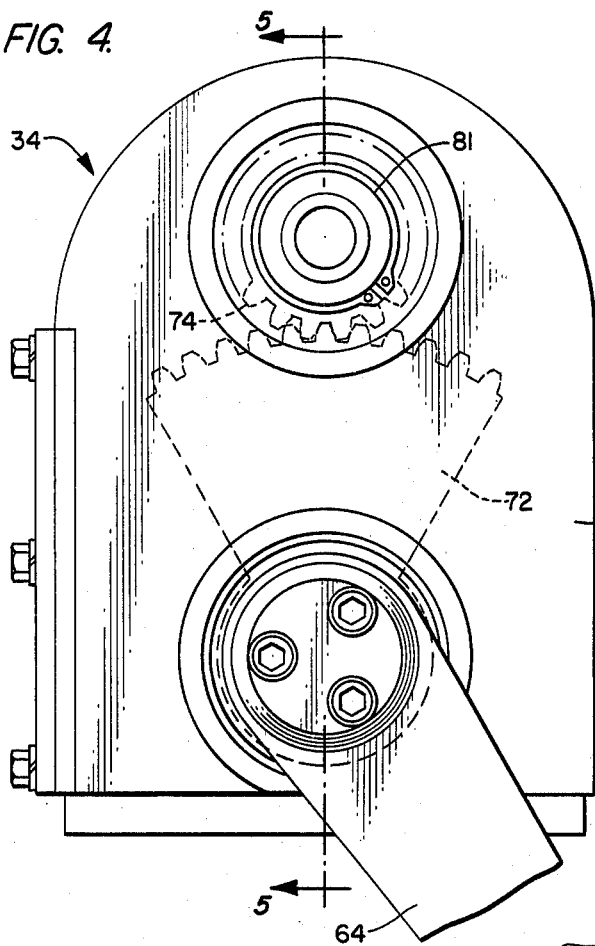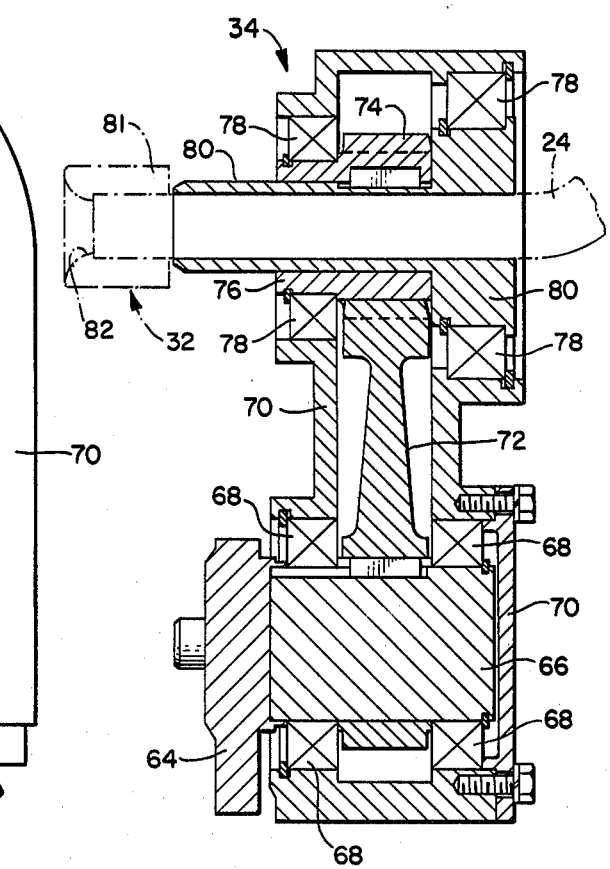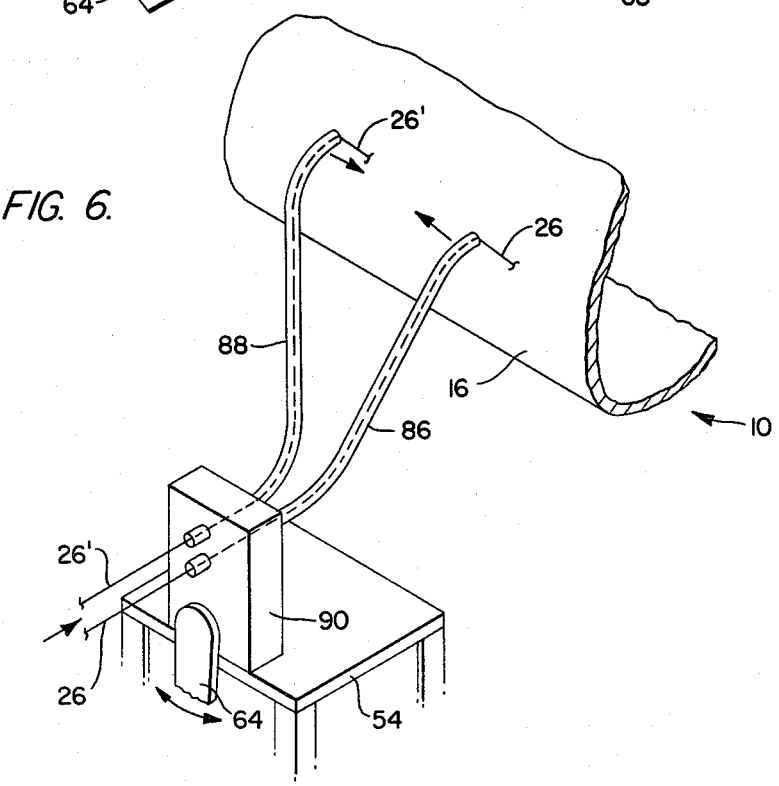

METHOD AND APPARATUS FOR LONGITUDINALLY REINFORCING CONTINUOUSLY GENERATED PLASTIC PIPE

BACKGROUND OF THE INVENTION

This invention relates to improvements in apparatus and methods of producing filament wound tubular products, and more particularly to a method and apparatus for applying longitudinal reinforcing to continuously generated plastic pipe.

In the manufacture of continuously generated plastic pipe, such as resin-impregnated fiber pipe of the type disclosed in U.S. Carter Pat. No. 3,700,519; Oct. 24, 1972, and U.S. Carter Pat. No. 4,053,343; Oct. 11, 1977, both assigned to the same assignee as the present invention, thermosetting resin-coated continuous fiber elements, such as glass rovings, are wound circumferentially onto a conveyor tube. The tube is rotated on a mandrel and continuously advanced in an axial direction. Normally, several winding stations are employed to build layers of resin-impregnated fibers upon the conveyor tube. Pipe so produced generally has high circumferential strength, but the axial strength is low due to the absence of longitudinally extending fibers in the pipe. Accordingly, additional steps must be taken to provide the required longitudinal reinforcing.

Applying longitudinal reinforcing in fiber wound plastic pipe has always been more difficult and costly than circumferential reinforcement. One manner of longitudinally reinforcing plastic pipe is to apply a fiber reinforced tape longitudinally to the pipe during the winding process. This is costly and unduly complicates the manufacture of the pipe.

Another method of applying longitudinal reinforcing fibers to sections of pipe being produced by the lathe method is disclosed in U.S. Goerden et al Pat. No. 3,791,900; Feb. 12, 1974. There, resin-impregnated fiber rovings being circumferentially wound onto a rotating mandrel pass over a pair of spaced rollers prior to being wound onto the pipe. Additional fiber rovings supplied through a reciprocating guide moving transverse to the direction of movement of the circumferential fibers are deposited onto the layer of circumferential fibers passing over the rollers. The additional fibers are deposited at a rate greater than the rate at which the circumferential fibers are being wound onto the pipe as loops or coils, disposed generally in a longitudinal direction, to form a resin-impregnated mat which is carried on the supporting layer of circumferential fibers and wound onto the pipe therewith. This technique does not permit precise control of the deposition of the longitudinal reinforcing.

SUMMARY OF THE INVENTION

It is an object of the invention to provide a new and improved method and apparatus for producing longitudinally reinforced continuously generated resin-impregnated fiber plastic pipe.

It is also an object to provide a method and apparatus for longitudinally reinforcing plastic pipe which uses the same type of fiber elements that are wound circumferentially onto the pipe.

It is additionally an object to provide a method and apparatus for longitudinally reinforcing plastic pipe which allows close control of the amount of longitudinal reinforcing fiber elements applied to the pipe.

It is a further object to provide a method and apparatus for longitudinally reinforcing plastic pipe from fixed stations, thereby enabling replenishment of the supply of reinforcing fiber elements without stopping the operation.

Briefly stated, in a method and apparatus for longitudinally reinforcing continuously generated plastic pipe according to the invention, a plurality of fiber elements are wound circumferentially onto the pipe being generated, and continuous fiber elements are deposited longitudinally onto the surface of the pipe in the nip formed between the surface of the pipe and the fiber elements being circumferentially wound onto the pipe.

In accordance with more specific aspects, the circumferential fiber elements are first passed through a resin bath and then over a pair of rollers contacting the surface of the pipe being generated. Longitudinal reinforcing fiber elements are deposited onto the surface of the pipe in the nip in a reciprocating pattern from a supply tube having its outlet, which is adjacent to the nip, swung in an arc substantially parallel to the longitudinal axis of the pipe. The rollers guide the fibers from the supply tube lengthwise onto the pipe. The fibers being circumferentially wound onto the pipe hold the longitudinal fibers in place against the pipe surface and coat them with resin.

These, and other objects, advantages, features and improved results provided by the invention will become apparent from the following detailed description and drawings of the preferred embodiments of the invention.

BRIEF DESCRIPTION OF THE DRAWINGS

FIG. 4 is an enlarged view illustrating details of the drive gear of the reciprocating supply tube mechanism of the apparatus;

FIG. 5 is a sectional view taken approximately in the plane of line 5—5 of FIG. 4;

FIG. 6 is a perspective view similar to a portion of FIG. 1, illustrating another embodiment of the apparatus;

DESCRIPTION OF THE PREFERRED EMBODIMENTS

Figure 1:
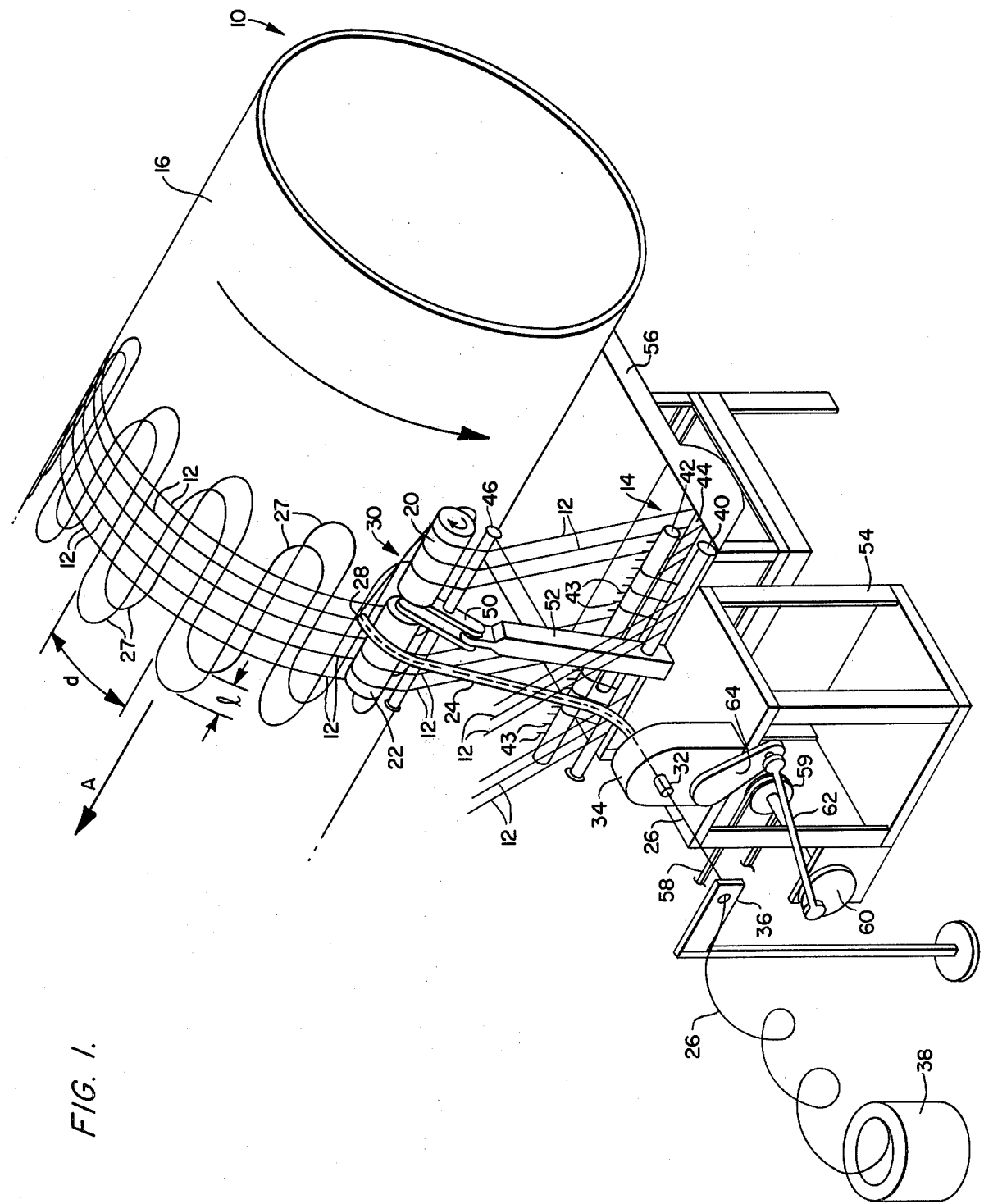
FIG. 1 is a perspective view of an apparatus for depositing longitudinal reinforcing fibers onto the surface of a pipe being continuously generated.
Figure 2:
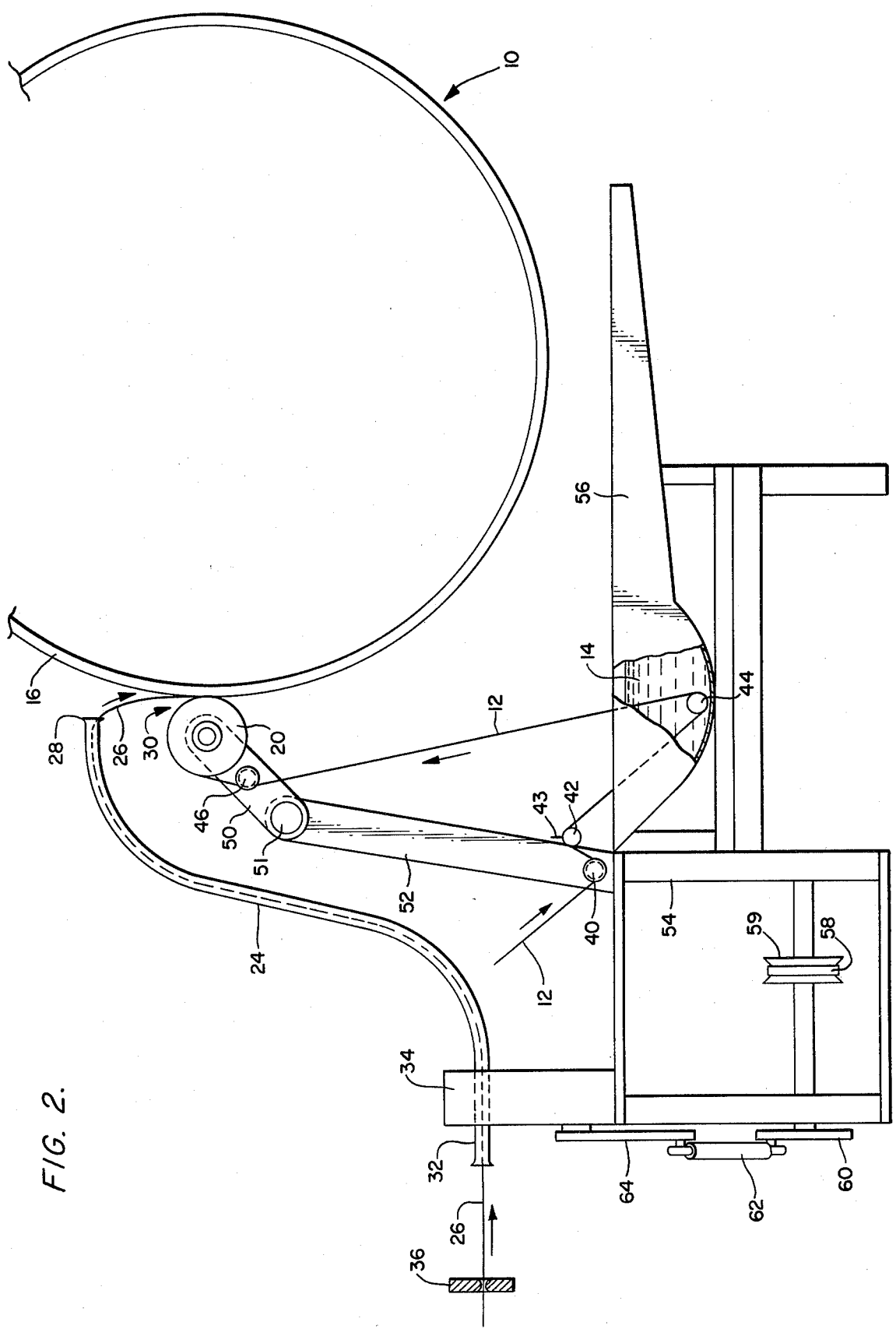
FIG. 2 is a side view of the apparatus of FIG. 1, omitting certain features.
Figure 3:
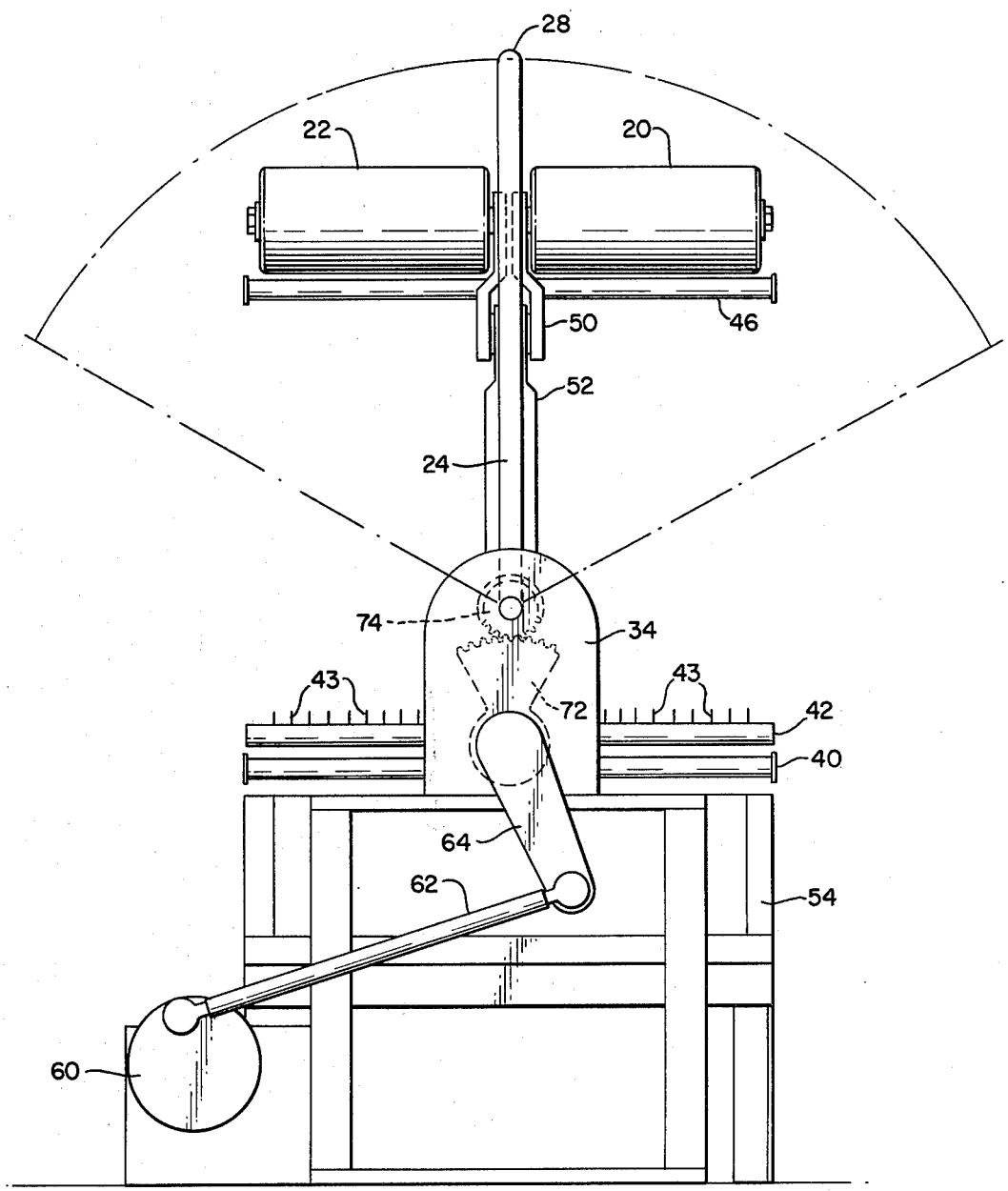
FIG. 3 is an end view of a portion of the apparatus of FIG. 1, illustrating a reciprocating supply tube mechanism and guide rollers.

Referring to the figures, a plastic pipe, such as a resin-impregnated fiber reinforced pipe 10, being continuously generated, as described, for example, in the afore-referenced Carter Pat. Nos. 3,700,519 and 4,053,343, the disclosures of which are incorporated by reference herein, is rotated in a counterclockwise direction on a mandrel, not illustrated, and simultaneously advanced in an axial direction A parallel to its longitudinal axis. The pipe is advanced at a rate substantially slower than its rate of rotation. A plurality of fiber elements 12, which may be a plurality of continuous fiber strands or fiber rovings comprising two or more strands, as of glass for example, are withdrawn from a suitable source (not shown), and passed through a resin bath 14 and wound circumferentially onto the surface 16 of the pipe as it is being rotated and generated. As the circumferential fiber elements 12 are wound onto the pipe, they are pulled over a pair of rollers 20, 22 which contact the surface of the pipe and rotate therewith. Fiber elements 12 cause the rollers to be maintained tightly against the glass-resin pipe surface, so that the rollers press fiber elements onto the pipe.

A generally S-shaped supply tube 24 for supplying longitudinal reinforcing fiber elements 26 has an outlet end 28 positioned adjacent to rollers 20, 22. The longitudinal fiber elements leaving the supply tube are deposited onto the surface of the pipe into the nip 30 formed between the surface of the pipe and the circumferential fiber elements 12 being wound upon the pipe at the point at which the circumferential fiber elements are pressed into contact with the pipe surface by the rollers. The rollers contact the pipe surface at the nip. The supply tube, which is preferably formed of light-weight steel, has its opposite end 32 connected to a gear mechanism 34 for reciprocatingly rotating the tube. By means of the gear mechanism, the inlet end 32 of the supply tube is rotated such that its outlet end 28 is swung in an arc, the plane of which is substantially parallel to the longitudinal axis of the pipe and the nip. As the supply tube swings alternately from one side to the other, the fiber elements 26 are caught first between one roller and the surface of the rotating pipe, and then between the other roller and the pipe surface. In this manner, the fiber elements are pulled through the swinging supply tube and guided back and forth in a longitudinal direction onto the pipe surface by the rollers. The fiber elements are laid onto the pipe in a sinuous or reciprocating pattern or circuit 27, extending substantially lengthwise, to reinforce the pipe in a longitudinal direction.

As the longitudinal fiber elements 26 are laid onto the pipe, the circumferential fiber elements 12 being wound around the pipe immediately contact the fiber elements 26 to hold them in place on the surface of the pipe and coat them with resin. The guiding action of the rollers in depositing the fiber elements from the swinging supply tube longitudinally onto the pipe, in combination with the holding action of the circumferential fiber elements ensures close control over the deposition pattern of the longitudinal reinforcing fiber elements.

Each complete cycle of reciprocation of the supply tube lays one circuit 27 of the longitudinal fiber elements onto the pipe. Due to the rotation of the pipe, adjacent circuits are spaced circumferentially around the pipe. The rate at which the tube swings, in relation to the rate of rotation of the pipe, determines the circumferential distance d between adjacent circuits. The axial rate of advance of the pipe per revolution determines the longitudinal distance l between circuits. Accordingly, by controlling these rates, the amount of longitudinal reinforcing applied to the pipe can be controlled, thereby permitting the axial strength of the pipe to be controlled. Other controllable factors which effect the amount of longitudinal reinforcing applied to the pipe include the yield (yds./lb.) of the total number of strands of longitudinal reinforcing fiber elements fed into the tube 24, the distance from the end of one roller to the end of the other roller, which determines the length of the circuits laid onto the pipe, and the arc through which the supply tube swings.

A plurality of longitudinal fiber elements 26 may be fed through the supply tube 24. The longitudinal fiber elements, like the circumferential fiber elements 12, may be either a plurality of individual fiber strands or a plurality of rovings comprising two or more strands of fibers. It is an advantage of the invention that the longitudinal reinforcing fiber elements may be the same type of standard rovings as the fiber rovings used for circumferential reinforcement, since these are the least expensive available.

The longitudinal fiber elements 26 are supplied to tube 24 through a guide 36 from a stationary creel 38. Since the creel is stationary, it can be replenished as necessary without stopping the process. This is a significant advantage in a continuous pipe manufacturing process. Similarly, circumferential fiber elements 12 may also be supplied from stationary creels, not illustrated, as is taught in the previously referenced Carter patents.

The circumferential fiber elements 12 being wound upon the pipe are guided through the resin bath 14 around guides 40, 42, 44, where they are coated with resin. Guide 42 may have a plurality of pins 43 for spacing the fiber elements apart in a longitudinal direction. The resin-impregnated fiber elements are then guided around guide 46 to rollers 20, 22. Rollers 20, 22 and guide 46 may be supported on an arm 50 pivoted for rotation at one end 51 on fixed arm 52 attached to a frame 54. Frame 54 may likewise support other parts of the apparatus, such as a tray 56 for containing the resin bath, gear mechanism 34, and the driving mechanism for the gear mechanism.

The gear mechanism which imparts the swinging motion to the supply tube 24 may be driven by a motor, not illustrated, through a belt 58, pulley 59, and crank wheel 60. The motor may include a variable speed drive, also not illustrated, for controlling the speed of the motor, in a well-known manner, and hence the rate of motion of the supply tube. Attached to the crank wheel is an arm 62 which connects with an arm 64 of the gear mechanism. As the crank wheel rotates, arm 64 oscillates, preferably through an angle of approximately 30 degrees, causing the supply tube to reciprocate. Gear mechanism 34 is preferably a 4:1 step-up, so that a 30 degree rotation of arm 64 produces a 120 degree arc of travel of the outlet end 28 of the supply tube. The motion of the supply tube produced by the gear mechanism is close to simple harmonic motion, which is desirable for laying a uniform pattern of longitudinal reinforcement.

Referring to FIGS. 4 and 5, the gear mechanism generally comprises a shaft 66 supported for rotation by bearings 68 in a frame 70, and attached to arm 64. Attached to shaft 66 is a sector gear 72 which mates with a second gear 74, having a shaft 76 supported for rotation by bearings 78 in the frame. Supply tube 24 passes through a bore on the axis of rotation of gear 74 and is attached thereto by means of a collar 80. As arm 64 rotates back and forth under the influence of arm 62 and crank wheel 60, sector gear 72 rotates back and forth, causing gear 74 and supply tube 24 to oscillate, thereby imparting a swinging motion to the outlet end 28 of the supply tube. The inlet end 32 of the supply tube may have a sleeve 81 (FIG. 5) having a rounded inner portion 82 at its inlet for guiding the fiber elements 26 as they are pulled through the supply tube.

Figure 8:
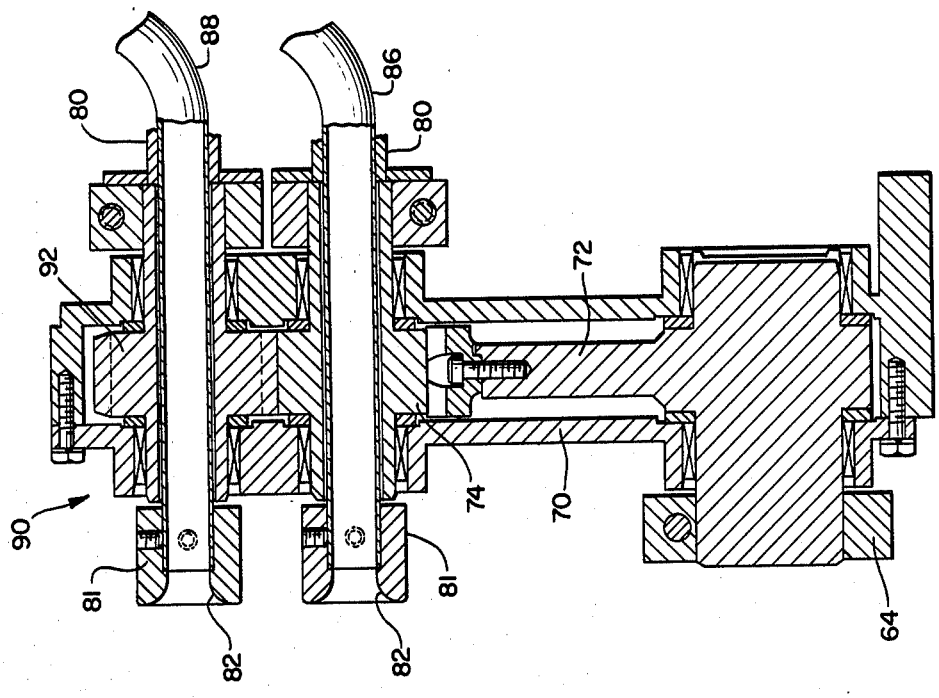
FIG. 8 is a sectional view taken approximately in the plane of line 8—8 of FIG. 7.
Figure 7:
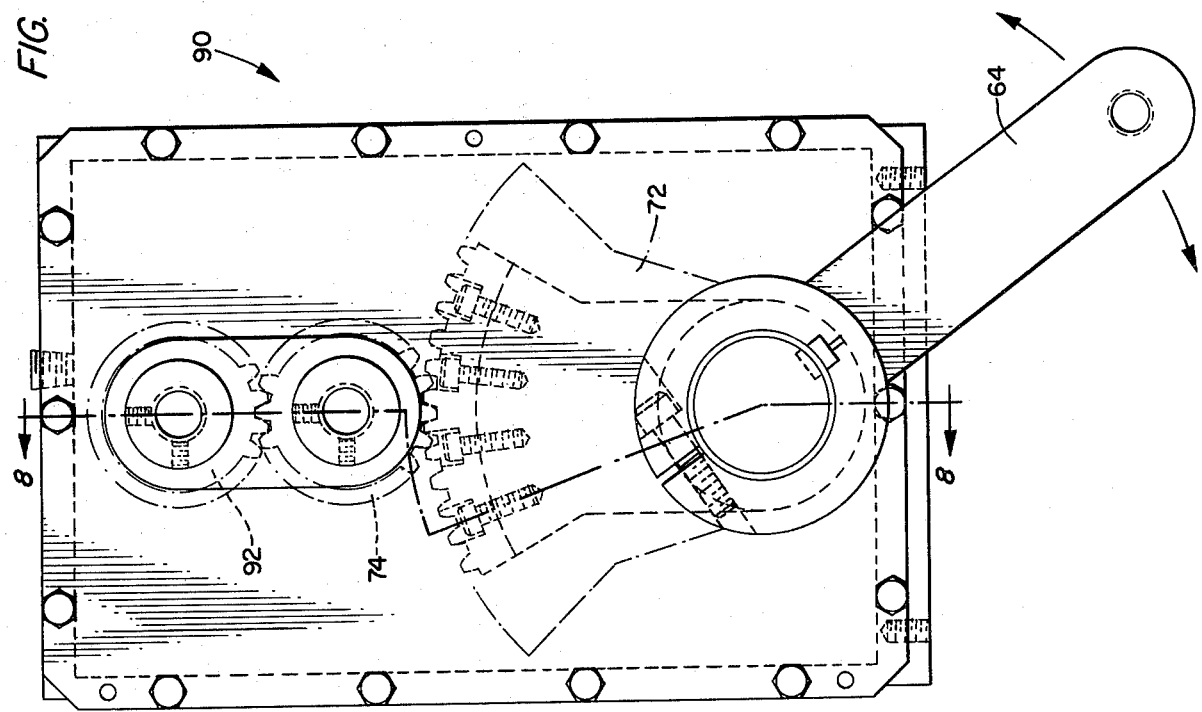
FIG. 7 is an enlarged view similar to FIG. 4 and the drive gear of the embodiment of FIG. 6.

FIGS. 6–8 illustrate another embodiment, wherein two supply tubes 86, 88, arranged to swing in opposite directions, are used for supplying longitudinal fiber elements 26, 26' to the pipe. Their movement is controlled by gear mechanism 90, which is similar to gear mechanism 34 except that a third gear 92 is coupled to gear 74 for rotation in the opposite direction to gear 74. Accordingly, as sector gear 72 rotates back and forth under the action of arm 64, supply tubes 86 and 88, which pass through the bores of gears 74 and 92, respectively, and are attached thereto, swing in arcs in opposite directions. The details of gear mechanism 90 are illustrated in FIGS. 7 and 8, where components performing functions similar to those of FIGS. 4 and 5 bear the same numerical designators.

The embodiment illustrated in FIGS. 6-8 permits a larger amount of longitudinal reinforcing to be applied to the pipe to provide greater axial strength.

While the foregoing description has been with reference to particular embodiments, it will be appreciated by those skilled in the art that variations are possible without departing from the spirit and scope of the invention, which is intended to be limited only by the appended claims.

I claim:

1. A method of longitudinally reinforcing continuously generated plastic pipe comprising winding a plurality of fiber elements circumferentially onto the pipe being generated, and depositing continuous fiber elements longitudinally onto the surface of the pipe in the nip formed between the surface of the pipe and the fiber elements being circumferentially wound onto the pipe.

2. A method of longitudinally reinforcing continuously generated plastic pipe comprising winding a plurality of fiber elements circumferentially onto the pipe being generated, the winding including winding the circumferential fiber elements over rollers contacting the surface of the pipe, and depositing continuous fiber elements longitudinally onto the surface of the pipe in the nip formed between the surface of the pipe and the fiber elements being circumferentially wound onto the pipe at the point of contact between the rollers and the pipe.

3. The method of claim 2, wherein the rollers guide the longitudinal fiber elements lengthwise onto the surface of the pipe.

4. The method of claim 2, wherein said depositing includes depositing the fiber elements in a reciprocating pattern in the longitudinal direction.

5. The method of claim 4, wherein the fiber elements are deposited from a first oscillating source moving substantially parallel to the longitudinal axis of the pipe.

6. The method of claim 5 further comprising depositing the fiber elements from a second oscillating source moving in opposite directions to the first oscillating source.

7. The method of claim 5 further comprising controlling the rate of movement of the oscillating source to control the amount of longitudinal fiber elements deposited.

8. The method of claim 1, wherein said depositing includes depositing a plurality of fiber elements simultaneously.

* * * * *